United States Patent
Nissim et al.

(10) Patent No.: US 8,935,415 B2
(45) Date of Patent: *Jan. 13, 2015

(54) MANAGING MID-DIALOG SESSION INITIATION PROTOCOL (SIP) MESSAGES

(71) Applicant: International Business Machines Corporation, Armonk, NY (US)

(72) Inventors: Nitzan Nissim, Rehovot (IL); Brian L. Pulito, Lexington, KY (US); Asaf Zinger, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,198

(22) Filed: Sep. 13, 2013

(65) Prior Publication Data

US 2014/0101322 A1 Apr. 10, 2014

Related U.S. Application Data

(63) Continuation of application No. 13/648,029, filed on Oct. 9, 2012.

(51) Int. Cl.
G06F 15/16 (2006.01)
H04L 29/08 (2006.01)
H04L 29/06 (2006.01)

(52) U.S. Cl.
CPC .......... *H04L 67/141* (2013.01); *H04L 65/1006* (2013.01); *H04L 65/105* (2013.01)
USPC ....................................... 709/228

(58) Field of Classification Search
None
See application file for complete search history.

(56) References Cited

U.S. PATENT DOCUMENTS

| 7,844,851 | B2 | 11/2010 | Cosmadopoulos et al. |
| 7,995,466 | B2 | 8/2011 | Baker et al. |
| 8,078,737 | B2 | 12/2011 | Cosmadopoulos et al. |
| 2007/0140112 | A1 | 6/2007 | Osterhout et al. |
| 2007/0220302 | A1 | 9/2007 | Cline et al. |
| 2007/0253328 | A1 | 11/2007 | Harper et al. |
| 2009/0022145 | A1* | 1/2009 | Bakshi et al. ................. 370/352 |
| 2009/0193057 | A1 | 7/2009 | Maes |
| 2010/0070563 | A1 | 3/2010 | Baker et al. |
| 2010/0205263 | A1 | 8/2010 | Langen et al. |

(Continued)

OTHER PUBLICATIONS

Rosenberg, J. "Reconsituting Call State in SIP User Agents", Internet Engineering Task Force, SIP WG, Internet Draft, Jul. 13, 2001, retrieved from the Internet: <http://www.jdrosen.net/papers/draft-rosenberg-sip-reconstitute-00.txt>.

(Continued)

*Primary Examiner* — Moustafa M Meky
*Assistant Examiner* — Clayton R Williams
(74) *Attorney, Agent, or Firm* — Cuenot, Forsythe & Kim, LLC

(57) ABSTRACT

Processing mid-dialog SIP messages by receiving a mid-dialog SIP message from a SIP user agent client, creating a new SIP session, associating the new SIP session with the mid-dialog SIP message, identifying an application that is associated with the mid-dialog SIP message, providing to the application the mid-dialog SIP message in the context of the new SIP session, receiving an acknowledgement from the application that the application will accept the mid-dialog SIP message, and responsive to receiving the acknowledgement, providing to the application the mid-dialog SIP message in the context of the new SIP session.

6 Claims, 5 Drawing Sheets

(56) References Cited

U.S. PATENT DOCUMENTS

| | | | |
|---|---|---|---|
| 2011/0007732 A1 | 1/2011 | Ward et al. | |
| 2011/0029812 A1 | 2/2011 | Lu et al. | |
| 2013/0311825 A1 | 11/2013 | Brunson et al. | |
| 2014/0047122 A1* | 2/2014 | Haserodt et al. | 709/228 |
| 2014/0095723 A1 | 4/2014 | Ezell et al. | |
| 2014/0101323 A1 | 4/2014 | Nissim et al. | |

OTHER PUBLICATIONS

Tahat, L.H. et al,. "Dual mode service: Learning from integrating an IP multimedia subsystem service into existing live networks", in Bell Labs Technical Journal, vol. 11, No. 4, pp. 135-150, 2007, retrieved from the Internet: <www.alcatel-lucent.com/enrich/v1/12007/pdf/bltj20200.pdfShare>.

Singh, K.M. "Reliable, Scalable and Interoperable Internet Telephony", PhD Thesis, Columbia University, Graduate School of Arts and Sciences, 2006, 383 pgs, retrieved from the Internet: <www1.cs.columbia.edu/~kns10/publication/thesis.pdf>.

U.S. Appl. No. 13/648,029, Non-Final Office Action, May 14, 2014, 19 pg.

U.S. Appl. No. 13/648,029, Notice of Allowance, Sep. 2, 2014, 13 pg.

* cited by examiner

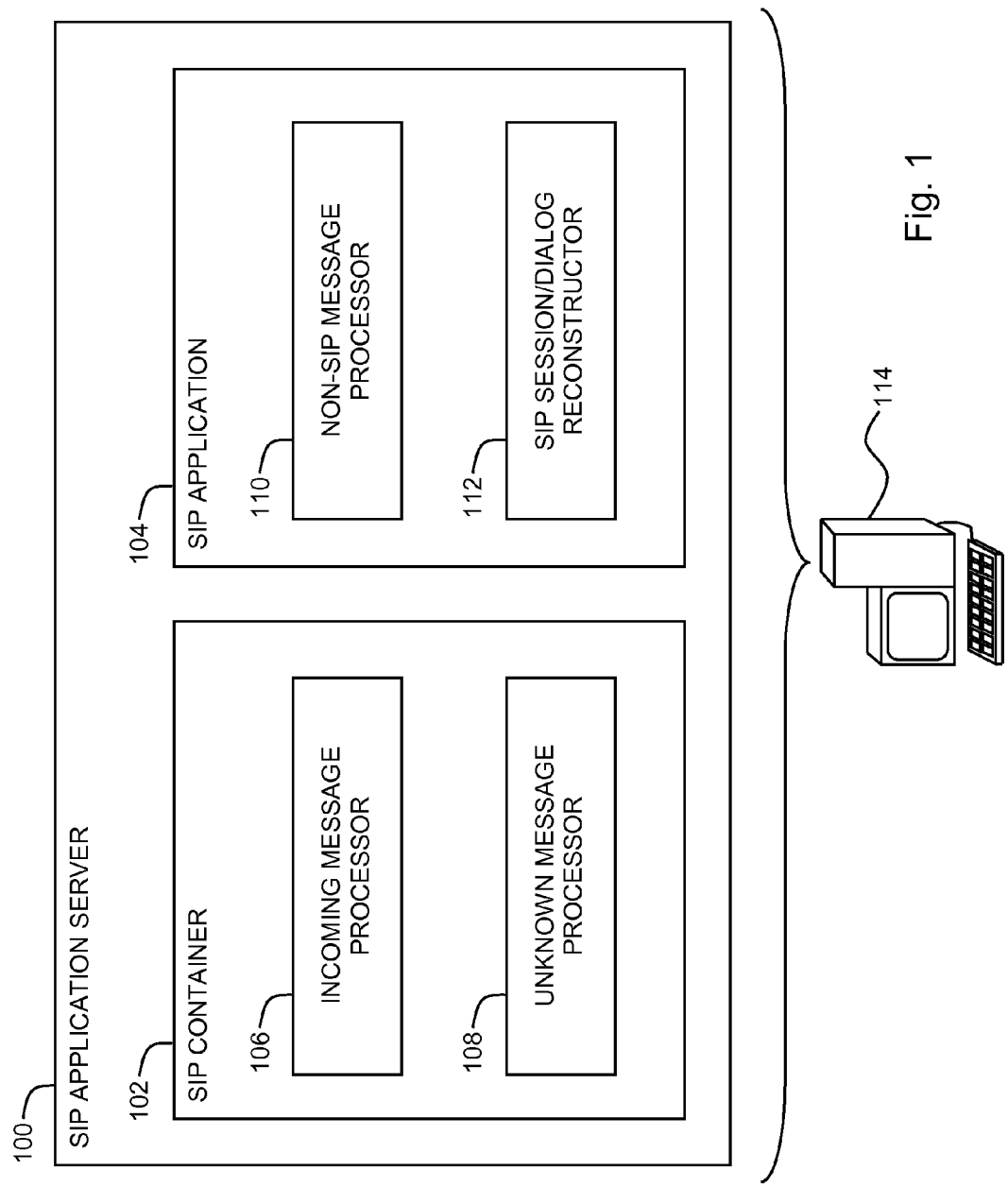

MANAGING MID-DIALOG SESSION INITIATION PROTOCOL (SIP) MESSAGES

CROSS-REFERENCE TO RELATED APPLICATIONS

This application is a Continuation of U.S. application Ser. No. 13/648,029, filed on Oct. 9, 2012, the entirety of which is incorporated herein by reference.

FIELD OF THE INVENTION

The present invention relates to computer networks in general, and more particularly to computer networks supporting SIP.

BACKGROUND OF THE INVENTION

The Session Initiation Protocol (SIP) is used to establish, manage, and terminate computer-network based communications. Such communications, including IP telephony, presence, and instant messaging, may be provided in one or more SIP application sessions. A SIP application server includes one or more SIP containers that invoke and terminate SIP application sessions, and manage messages and responses that are sent and received in the context of SIP application sessions. Each participant in a SIP application session is represented by a separate SIP session. Thus, for example, a SIP application session representing a computer network-based conference call having multiple participants would have multiple SIP sessions associated with it, where a separate SIP session is associated with each participant in the conference call.

Once a SIP container has created a SIP session for a participant in a SIP application session, the SIP container and the participant conduct their SIP session communications as part of a SIP dialog. Normally, mid-dialog SIP messages sent by the participant are routed only to the SIP container that is managing the SIP session, as the SIP container and any application instances that are associated with the related SIP application session maintain state information in connection with the SIP session. In some systems such state information is continuously replicated to a backup site that enables management of a SIP session to be taken over mid-dialog by a SIP container that did not create the SIP session. However, such mechanisms are often costly or otherwise impractical due to performance constraints.

SUMMARY OF THE INVENTION

In one aspect of the invention a method is provided for processing mid-dialog SIP messages, the method including receiving a mid-dialog SIP message from a SIP user agent client, creating a new SIP session, associating the new SIP session with the mid-dialog SIP message, identifying an application that is associated with the mid-dialog SIP message, providing to the application the mid-dialog SIP message in the context of the new SIP session, receiving an acknowledgement from the application that the application will accept the mid-dialog SIP message, and responsive to receiving the acknowledgement, providing to the application the mid-dialog SIP message in the context of the new SIP session.

In another aspect of the invention a method is provided for processing mid-dialog SIP messages, the method including receiving a mid-dialog SIP message from a SIP user agent client, creating a new SIP session, and associating the new SIP session with the mid-dialog SIP message.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 1 is a simplified conceptual illustration of a system for managing mid-dialog SIP messages, constructed and operative in accordance with an embodiment of the invention;

DETAILED DESCRIPTION OF THE INVENTION

Figure 2A:
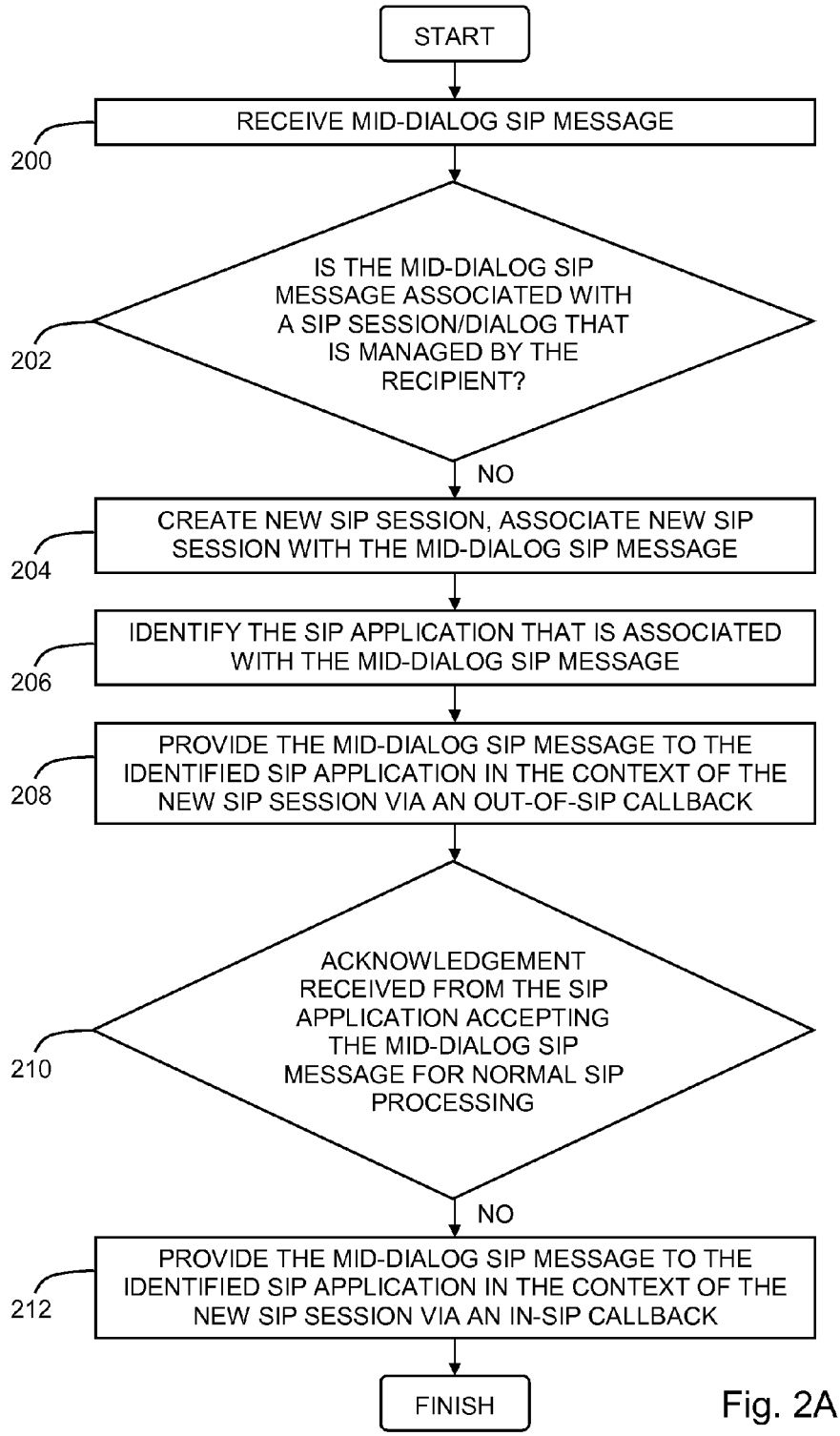
FIG. 2A is a simplified flowchart illustration of an exemplary method of operation of SIP container 102 of the system of FIG. 1, operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for managing mid-dialog Session Initiation Protocol (SIP) messages, constructed and operative in accordance with an embodiment of the invention. In the system of FIG. 1, a SIP application server 100 is configured with a SIP container 102 and a SIP application 104. Beyond their known configurations in the art with respect to managing and processing SIP-related transactions relating to SIP application sessions, SIP sessions and SIP dialogs, SIP application server 100, SIP container 102, and SIP application 104 are preferably configured to operate as described hereinbelow.

SIP container 102 preferably includes an incoming message processor 106 and an unknown message processor 108. Incoming message processor 106 is preferably configured to determine whether a SIP message that is received by SIP container 102, such as from a SIP user agent client (UAC), is a mid-dialog SIP message and, if so, whether the mid-dialog SIP message is associated with a SIP session/dialog that is managed by SIP container 102. Unknown message processor 108 is preferably configured such that if the mid-dialog SIP message is not associated with a pre-existing SIP session/dialog that is managed by SIP container 102, then unknown message processor 108 creates a new SIP session and associates the new SIP session with the mid-dialog SIP message. Unknown message processor 108 identifies that SIP application 104 is associated with the mid-dialog SIP message, such as using an application identifier included in the mid-dialog SIP message, and provides the mid-dialog SIP message in the context of the new SIP session to SIP application 104 via a callback to SIP application 104, where this callback is preferably an out-of-SIP-protocol callback. If unknown message processor 108 receives an acknowledgement from SIP application 104 that SIP application 104 will accept the mid-dialog SIP message for normal SIP processing, SIP container 102 provides the mid-dialog SIP message in the context of the new SIP session to SIP application 104 via another callback to SIP application 104, where this callback is preferably a normal, in-SIP-protocol callback.

SIP application 104 preferably includes a non-SIP message processor 110 and a SIP session/dialog reconstructor 112. Non-SIP message processor 110 preferably includes a non-SIP API configured to receive the out-of-SIP-protocol callback from SIP container 102 that includes the mid-dialog SIP message in the context of the new SIP session. SIP session/dialog reconstructor 112 is preferably configured to decide whether it is able to accept the mid-dialog SIP message for normal SIP processing, which may require successfully reconstructing some or all of the state information of the original SIP session/dialog associated with the mid-dialog SIP message. If SIP session/dialog reconstructor 112 decides that it is able to accept the mid-dialog SIP message for normal SIP processing, then non-SIP message processor 110 sends an out-of-SIP-protocol acknowledgement to SIP container 102 indicating that SIP application 104 will accept the mid-dialog SIP message for normal SIP processing.

Any of the elements shown in FIG. 1 are preferably implemented by one or more computers, such as computer 114, in computer hardware and/or in computer software embodied in a non-transitory, computer-readable medium in accordance with conventional techniques.

Reference is now made to FIG. 2A, which is a simplified flowchart illustration of an exemplary method of operation of SIP container 102 of the system of FIG. 1, operative in accordance with an embodiment of the invention. In the method of FIG. 2A, a mid-dialog SIP message is received (step 200), such as where the mid-dialog SIP message is sent from a SIP user agent client (UAC) and where the recipient of the mid-dialog SIP message is a SIP container. If the mid-dialog SIP message is not associated with a SIP session/dialog that is managed by the recipient (step 202), a new SIP session is created and associated with the mid-dialog SIP message (step 204). The SIP application that is associated with the mid-dialog SIP message is identified (step 206), such as using an application identifier included in the mid-dialog SIP message. The mid-dialog SIP message is provided to the identified SIP application in the context of the new SIP session via a callback (step 208), where this callback is preferably an out-of-SIP-protocol callback. If an acknowledgement is received from the SIP application accepting the mid-dialog SIP message for normal SIP processing (step 210), then the mid-dialog SIP message is provided to the identified SIP application in the context of the new SIP session via another callback (step 212), where this callback is preferably a normal, in-SIP-protocol callback.

Figure 2B:
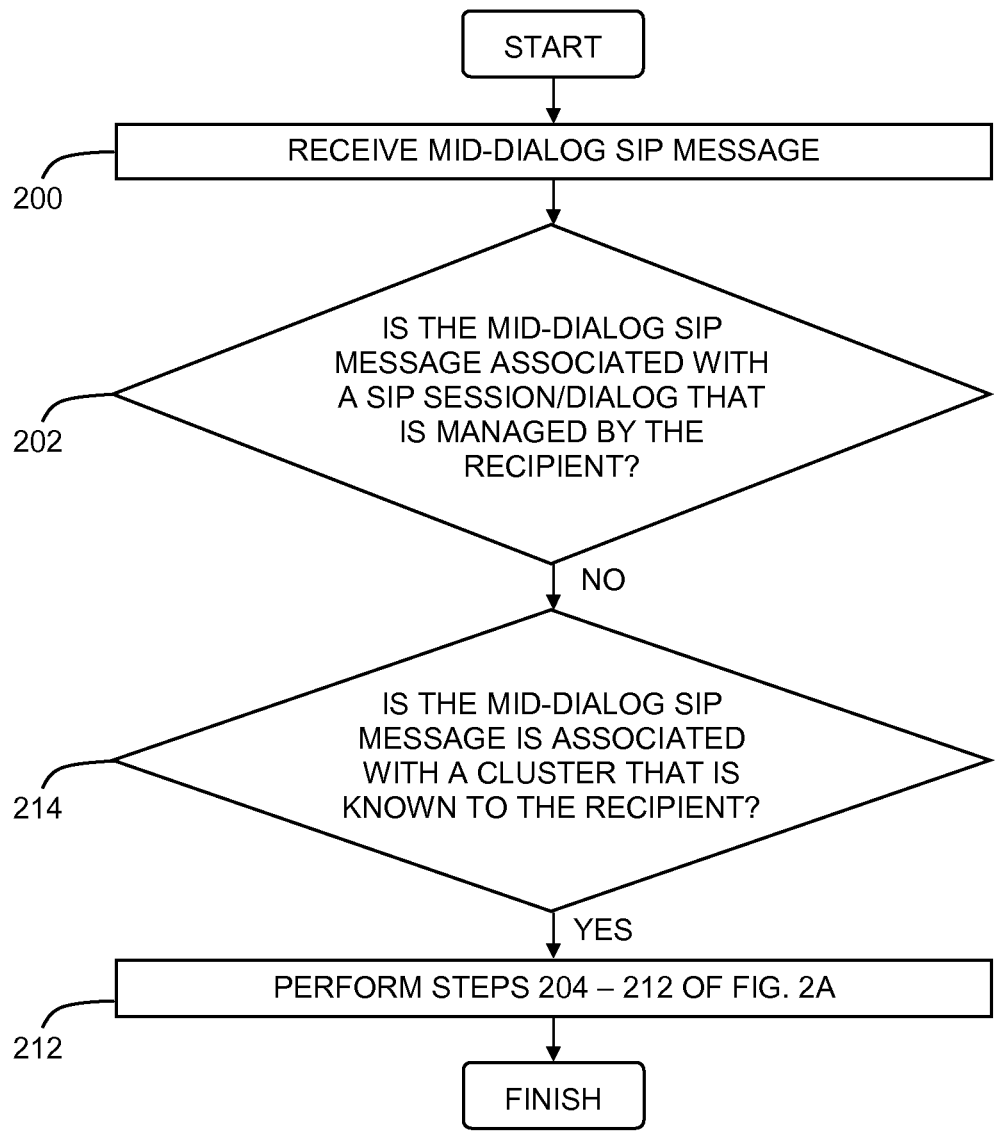
FIG. 2B is a simplified flowchart illustration of an exemplary method of operation of SIP container 102 of the system of FIG. 1, operative in accordance with an alternative embodiment of the invention.

Reference is now made to FIG. 2B, which is a simplified flowchart illustration of an exemplary method of operation of SIP container 102 of the system of FIG. 1, operative in accordance with an alternative embodiment of the invention. The method of FIG. 2B is substantially similar to the method of FIG. 2A with the notable exception that steps 204-212 are performed only if the mid-dialog SIP message is associated with a cluster, such as of SIP containers and/or SIP application servers, that is known to the recipient of the mid-dialog SIP message (step 214), such as where the recipient of the mid-dialog SIP message is part of a backup cluster for the cluster associated with the mid-dialog SIP message.

Figure 3:
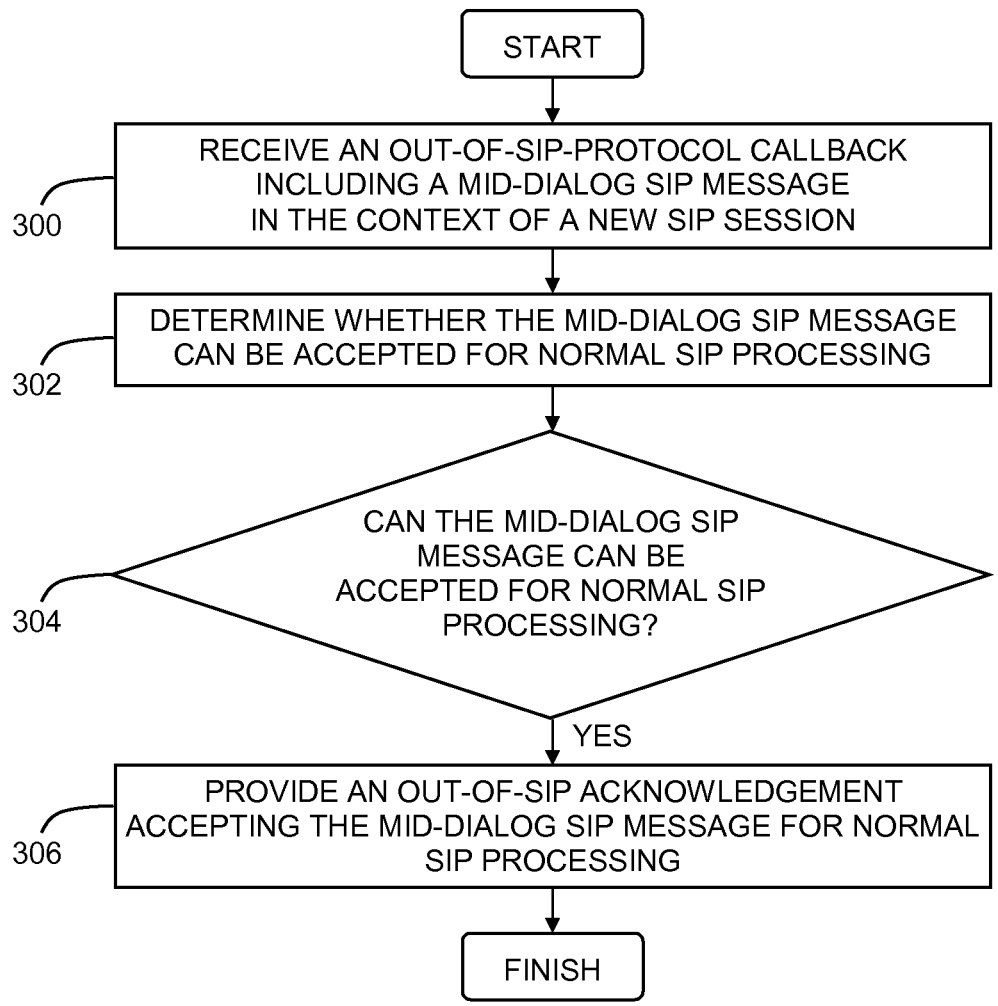
FIG. 3 is a simplified flowchart illustration of an exemplary method of operation of SIP application 104 of the system of FIG. 1, operative in accordance with an embodiment of the invention.

Reference is now made to FIG. 3, which is a simplified flowchart illustration of an exemplary method of operation of SIP application 104 of the system of FIG. 1, operative in accordance with an embodiment of the invention. In the method of FIG. 3, an out-of-SIP-protocol callback is received by a SIP application, such as from a SIP container, where the callback includes a mid-dialog SIP message in the context of the new SIP session (step 300). A determination is made whether the mid-dialog SIP message can be accepted for normal SIP processing (step 302), which may require successfully reconstructing some or all of the state information of the original SIP session/dialog associated with the mid-dialog SIP message. If the SIP application decides that it is able to accept the mid-dialog SIP message for normal SIP processing (step 304), then an out-of-SIP-protocol acknowledgement is sent to the requestor indicating that the SIP application will accept the mid-dialog SIP message for normal SIP processing (step 306).

Figure 4:
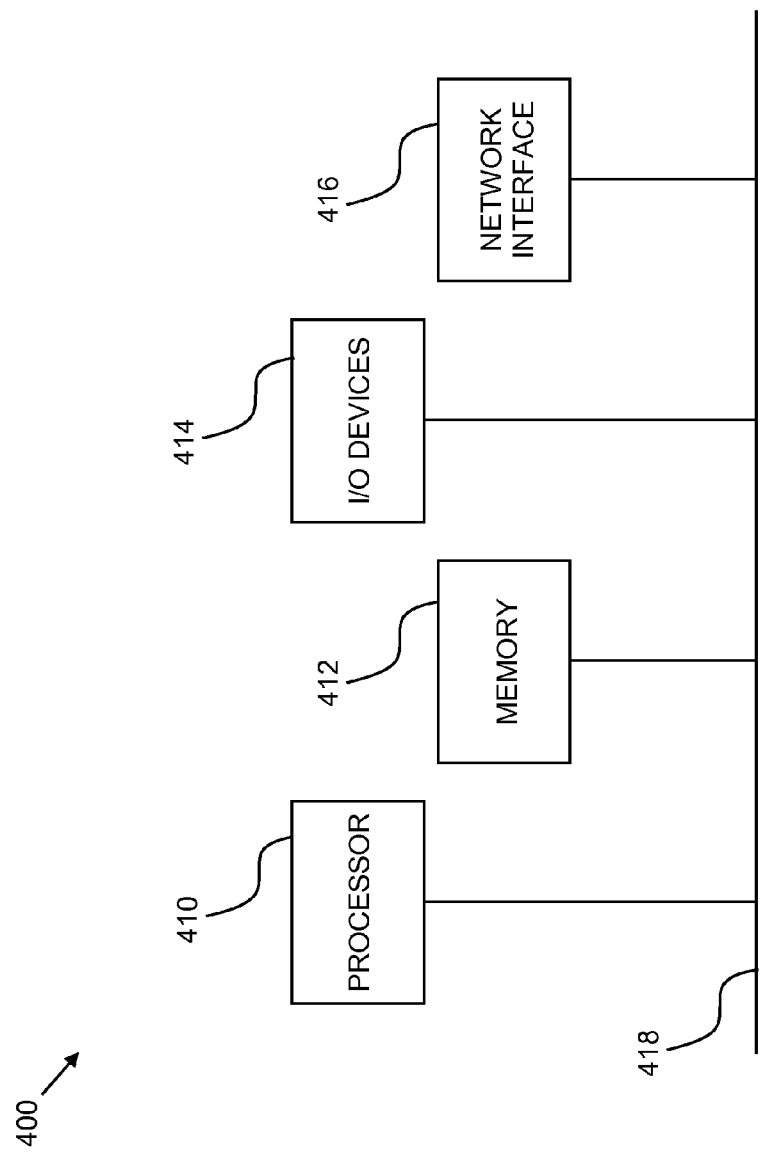
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for processing mid-dialog SIP messages, the method comprising:
   receiving a mid-dialog SIP message from a SIP user agent client;
   creating a new SIP session;
   associating the new SIP session with the mid-dialog SIP message;
   identifying an application that is associated with the mid-dialog SIP message;
   providing to the application the mid-dialog SIP message in the context of the new SIP session;
   receiving an acknowledgement from the application that the application will accept the mid-dialog SIP message; and responsive to receiving the acknowledgement, providing to the application the mid-dialog SIP message in the context of the new SIP session.

2. The method according to claim 1 wherein creating a new SIP session and associating the new SIP session with the mid-dialog SIP message are performed responsive to unsuccessfully associating the mid-dialog SIP message with a pre-existing SIP session.

3. The method according to claim 1 wherein the providing to the application the mid-dialog SIP message in the context of the new SIP session comprises providing the mid-dialog SIP message in an out-of-SIP-protocol callback to the application.

4. The method according to claim 3 wherein the providing to the application the mid-dialog SIP message in the context of the new SIP session comprises providing the mid-dialog SIP message in an in-protocol SIP callback to the application.

5. The method according to claim 1 wherein the identifying an application that is associated with the mid-dialog SIP message comprises identifying the application using an application identifier included in the mid-dialog SIP message.

6. The method according to claim 1 wherein the creating a new SIP session and associating the new SIP session with the mid-dialog SIP message are performed responsive to determining that the mid-dialog SIP message is associated with a cluster that is known to a recipient of the mid-dialog SIP message.

* * * * *